United States Patent [19]
Hasegawa et al.

[11] Patent Number: 5,874,723
[45] Date of Patent: Feb. 23, 1999

[54] CHARGING APPARATUS FOR WIRELESS DEVICE WITH MAGNETIC LEAD SWITCH

[75] Inventors: Kazuo Hasegawa; Junichi Ouchi, both of Miyagi-ken, Japan

[73] Assignee: Alps Electric Co., Ltd., Tokyo, Japan

[21] Appl. No.: 800,797

[22] Filed: Feb. 12, 1997

[30] Foreign Application Priority Data

Feb. 13, 1996 [JP] Japan .................................. 8-025536

[51] Int. Cl.$^6$ ..................................................... G06K 7/10
[52] U.S. Cl. .......................... 235/472; 235/439; 235/441; 320/115
[58] Field of Search ................................. 235/472, 454, 235/383, 385, 439, 441; 320/106, 113, 114, 115

[56] References Cited

U.S. PATENT DOCUMENTS

| | | | |
|---|---|---|---|
| 3,200,320 | 8/1965 | Mallory | 230/115 |
| 4,290,059 | 9/1981 | Noyes et al. | 340/624 |
| 4,441,066 | 4/1984 | Burmenko | 320/165 |
| 4,945,216 | 7/1990 | Tanabe et al. | 235/472 |
| 5,250,892 | 10/1993 | Yang | 230/107 |
| 5,465,038 | 11/1995 | Register | 235/375 |
| 5,468,948 | 11/1995 | Koenck et al. | 235/472 |
| 5,521,370 | 5/1996 | Hanson | 235/472 |
| 5,536,979 | 7/1996 | McEachern et al. | 320/2 |

FOREIGN PATENT DOCUMENTS

| | | |
|---|---|---|
| 2-151231 | 11/1990 | Japan . |
| 4-261337 | 9/1992 | Japan . |
| 8-205413 | 8/1996 | Japan . |

*Primary Examiner*—Anita Pellman Gross
*Assistant Examiner*—Diane I. Lee
*Attorney, Agent, or Firm*—Brinks Hofer Gilson & Lione

[57] ABSTRACT

A charging apparatus suitable for use with a wireless device, which is capable of eliminating the occurrence of an electric shock and an electrical short due to an operator's contact with charging terminals of the wireless device upon non-charging of the wireless device. The charging apparatus comprises a charger including a wireless device placement portion, a pair of charging terminals exposed to the wireless device placement portion, a charging circuit portion for supplying power for charging the wireless device to the charging terminals, and a built-in magnet; and the wireless device including a secondary battery, a pair of power receiving terminals respectively provided at positions where they are brought into contact with the charging terminals when the wireless device is placed in the wireless device placement portion, and a magnetic switch. When the wireless device is placed in the wireless device placement portion and the magnetic switch detects magnetism of the magnet, the secondary battery is electrically connected to the pair of power receiving terminals so as to charge the secondary battery.

5 Claims, 4 Drawing Sheets

CHARGING APPARATUS FOR WIRELESS DEVICE WITH MAGNETIC LEAD SWITCH

BACKGROUND OF THE INVENTION

The present invention relates to a charging apparatus suitable for use with a wireless device, and particularly to a charging apparatus suitable for use with a wireless device, which is capable of stopping the application of a voltage across power receiving terminals upon usage of the wireless device by a simple circuit configuration without a change in the sizes of the wireless device.

A manually-operated wireless device, e.g., a bar-code scanner for reading bar codes has heretofore utilized a battery incorporated therein as a power supply. Once the built-in battery wears, the bar-code scanner does not read each bar code with accuracy. Thus, when the bar-code scanner is not in use, i.e., when the reading of the bar code is not being performed by the bar-code scanner, the bar-code scanner is normally electrically connected to a charger so that the battery incorporated in the bar-code scanner is charged by charging power produced from the charger.

Figure 3A:
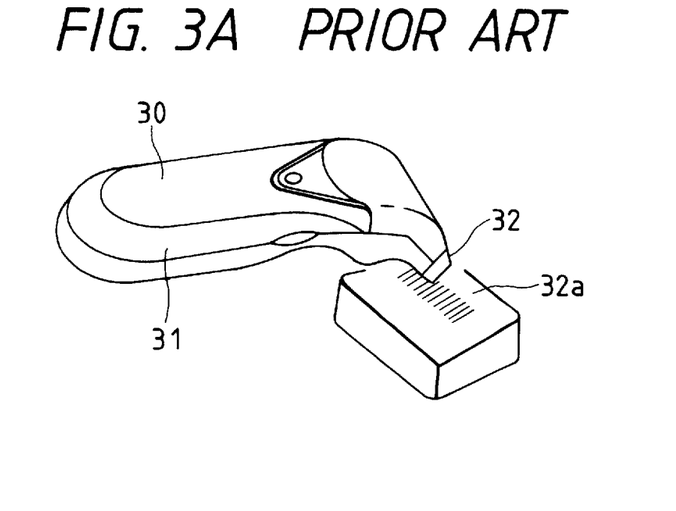
FIGS. 3A and 3B are perspective views illustrating examples of configurations of an already-known bar-code scanner and a charger therefor.
Figure 3B:
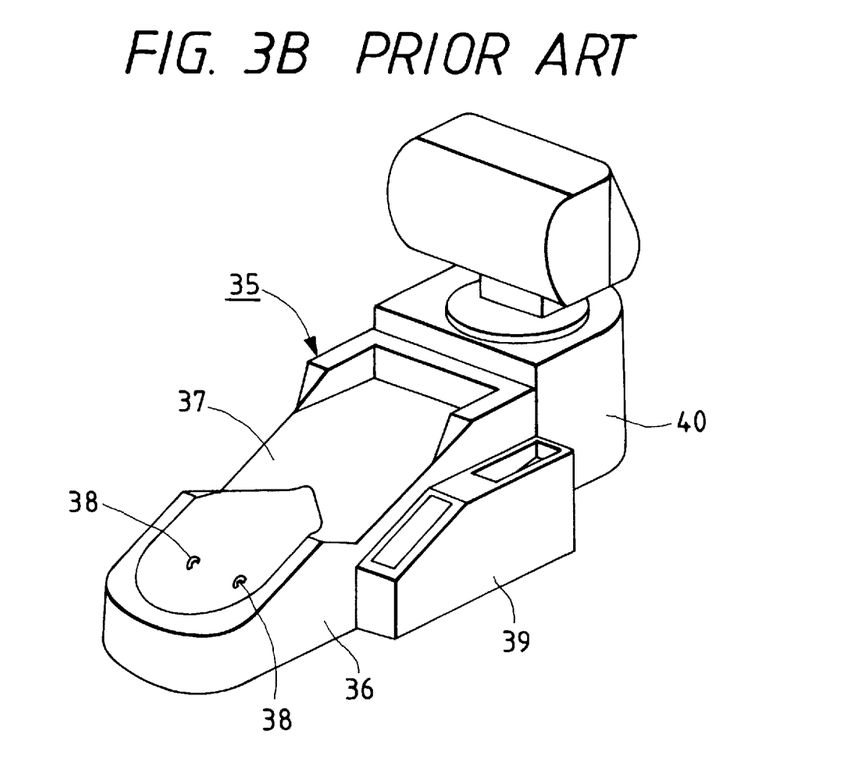

FIGS. 3A and 3B are a perspective view showing examples of configurations of an already-known bar-code scanner and a charger therefor. FIG. 3A illustrates one example of the configuration of the bar-code scanner and FIG. 3B shows one example of the configuration of the charger.

Figure 4:
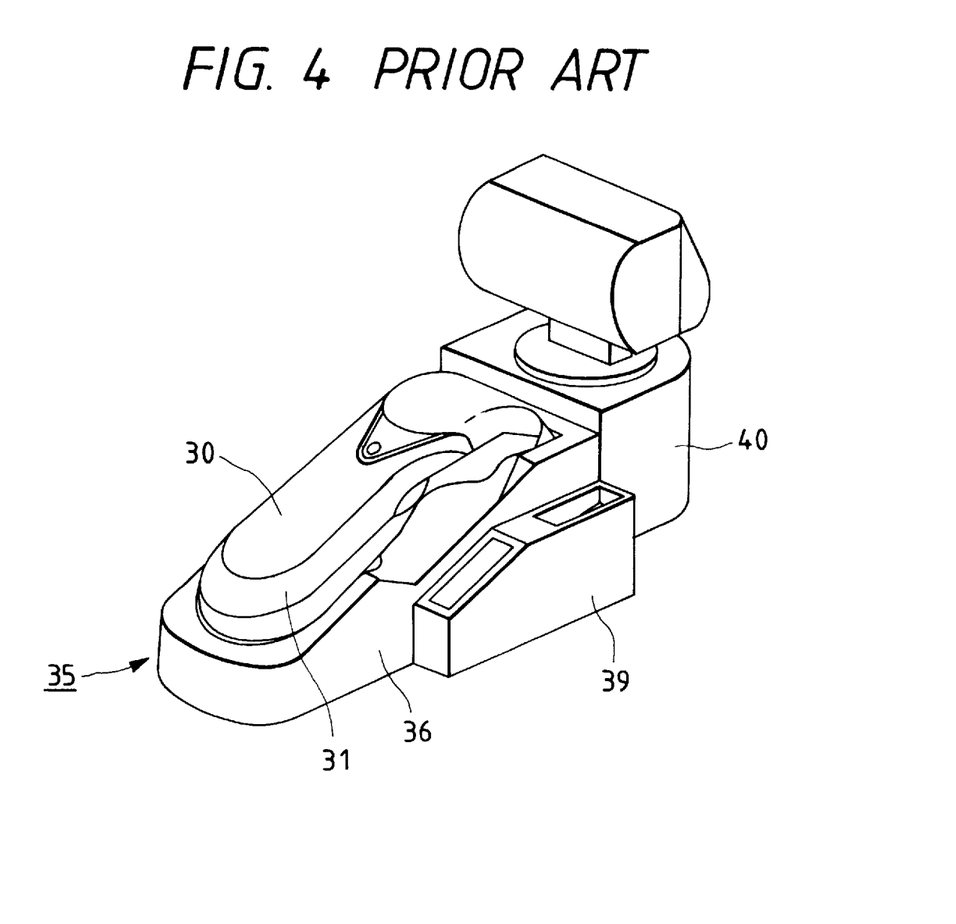
FIG. 4 is a perspective view showing one example of a configuration of a charging apparatus suitable for use with the bar-code scanner shown in FIG. 3.

FIG. 4 shows a state in which the bar-code scanner shown in FIG. 3A has been connected to the charger shown in FIG. 3B, i.e., FIG. 4 is a perspective view illustrating one example of a configuration of a charging apparatus suitable for use with the known bar-code scanner.

As shown in FIG. 3A, the bar-code scanner 30 comprises a main body 31, a bar-code reader 32, a pair of power receiving terminals (not shown) mounted to the main body 31, and a built-in power battery (not shown). Upon operation of the bar-code scanner 30, the main body 31 is gripped with hand and the bar-code reader 32 is turned toward a bar code 32a. Thereafter, the bar-code reader 32 suitably scans over the bar code 32a to read the bar code 32a.

As illustrated in FIG. 3B, the charger 35 comprises a main body 36, a bar-code scanner placement portion 37 provided on the upper side of the main body 36, a pair of charging terminals 38 exposed to the bar-code scanner placement portion 37, a charging circuit portion 39 provided on the side of the main body 36, and a communication control unit 40 provided on the rear side of the main body 36. When the bar-code scanner 30 is placed in the bar-code scanner placement portion 37 as shown in FIG. 4, the pair of charging terminals 38 are respectively electrically brought into contact with the pair of power receiving terminals on the bar-code scanner 30 side so that charging power outputted from the charging circuit portion 39 serves so as to charge the built-in power battery of the bar-code scanner 30 through the charging terminals 38 and the power receiving terminals. In this case, the communication control unit 40 performs wireless communications with the bar-code scanner 30 and controls communications with a host computer (not shown).

The known charging apparatus suitable for use with the bar-code scanner has a problem in that since the pair of charging terminals 38 mounted to the bar-code scanner placement portion 37 on the charger 30 side projects from the bar-code scanner placement portion 37 upon reading the bar code 32a by the bar-code scanner 35, an operator or others do not experience an abrupt impact due to an electric shock when being accidentally placed in contact with the pair of charging terminals 38, and an electrical short occurs across the pair of charging terminals 38 when a foreign matter composed of a conductor is brought into contact with the pair of charging terminals 38.

In order to solve such a problem, a charging apparatus suitable for use with a bar-code scanner has already been proposed which is capable of stopping the supply of power to the pair of charging terminals 38 when the bar-code scanner 30 is not placed in the bar-code scanner placement portion 37, thereby preventing the occurrence of the abrupt impact and electrical short due to the electric shock. A charging apparatus suitable for use with a bar-code scanner, which has been disclosed in Japanese Patent Application Laid-Open No. 2-151231, is known as one example.

In the charging apparatus disclosed in Japanese Patent Application Laid-Open No. 2-151231, a lead switch is provided on the charger 35 side so as to be placed between a charging circuit portion 39 and a pair of charging terminals 38. Further, a magnet is disposed on the bar-code scanner 30 side. When the bar-code scanner 30 is placed in a bar-code scanner placement portion 37, the lead switch on the charger 30 side is closed under the supply of a magnetic field produced from the magnet on the bar-code scanner 30 side so as to connect the charging circuit portion 39 and the pair of charging terminals 38 to each other, whereby charging power is supplied to the pair of charging terminals 38. On the other hand, when the bar-code scanner 30 is not placed in the bar-code scanner placement portion 37, i.e., when the bar-code scanner 30 is used to read a bar code 32a, the supply of the magnetic field from the magnet on the bar-code scanner 30 side is interrupted so as to open the lead switch on the charger 30 side thereby to disconnect the charging circuit portion 39 from the pair of charging terminals 38, whereby the supply of the charging power to the pair of charging terminals 38 is stopped.

Since the supply of the charging power to the pair of charging terminals 38 on the charger 35 side is stopped when the bar-code scanner 30 is not placed in the bar-code scanner placement portion 37, i.e., the reading of the bar code 32a by the bar-code scanner 30 is being performed, the charging apparatus disclosed in Japanese Patent Application Laid-Open No. 2-151231 can prevent the abrupt impact and the electrical short from occurring on the charger 35 side due to the electric shock.

However, the charging apparatus referred to above has a new problem in that since a voltage produced from a built-in power battery remains applied to a pair of power receiving terminals exposed on the bar-code scanner 30 side, an operator of the bar-code scanner 30 will experience an abrupt impact due to an electric shock when the operator accidentally makes contact with the pair of power receiving terminals.

Further, the above-described charging apparatus has a further new problem in that since it is quite common that a conductive material such as waterdrops or the like is attached to each of products if considering where the charger 35 doubles as a terminal device of a POS system and each of bar codes marked on the products is read by the bar-code scanner 30, the exposed pair of power receiving terminals is electrically short-circuited by the conductive material such as the waterdrops, so that the power battery incorporated into the bar-code scanner 30 is suddenly used up.

SUMMARY OF THE INVENTION

With the foregoing new problems in view, it is therefore an object of the present invention to provide a charging apparatus suitable for use with a wireless device, which is capable of preventing an electric shock and an electrical short from occurring due to a contact between the wireless device and charging terminals upon non-charging of the wireless device.

According to one aspect of the present invention, for achieving the above object, there is provided a charging apparatus suitable for use with a wireless device, comprising: a charger including, a wireless device placement portion; a pair of charging terminals exposed to the wireless device placement portion; a charging circuit portion for supplying power for charging the wireless device to the pair of charging terminals; and a magnet incorporated therein; and means provided on the wireless device side, including, a secondary battery; a pair of power receiving terminals respectively provided at positions where they are brought into contact with the pair of charging terminals when the wireless device is placed in the wireless device placement portion; and a magnetic switch incorporated therein.

When the wireless device is in an unused state and is placed in the wireless device placement portion on the charger side, the magnetic switch on the wireless device side is closed by detecting magnetism produced from the magnet on the charger side so that the secondary battery and the pair of charging terminals are electrically connected to one another. Therefore, the secondary battery is charged by the charging power outputted from the charging circuit portion on the charger side. On the other hand, when the wireless device is in use and the wireless device is not placed in the wireless device placement portion on the charger side, the magnetic switch on the wireless device side is opened without detecting the magnetism of the magnet on the charger side so that the secondary battery is electrically disconnected from the pair of charging terminals. As a result, no charging power is supplied between the pair of charging terminals.

If a lead switch is used for the magnetic switch in this case, it is then suitable for the magnetic switch because a small and simple circuit configuration is obtained. If non-connection detecting means for detecting a non-connected state of one power receiving terminal on the wireless device side is connected to one charging terminal on the charger side and the supply of charging power to one charging terminal is interrupted when the non-connection detecting means produces a detected output, it is then preferable to provide the non-connection detecting means because an operator does not experience an abrupt impact due to an electric shock when contacting between the pair of charging terminals on the charger side and a short circuit produced due to a conductive material contacting between the pair of charging terminals is avoided.

If the above means is adopted, the charging voltage is not applied across the charging terminals on the wireless device side when the wireless device is in use and is not placed in the wireless device placement portion on the charger side. Therefore, even when the operator accidentally contacts between the pair of charging terminals, the operator does not experience the abrupt impact due to the electric shock.

In one embodiment according to the present invention, a charging apparatus suitable for use with a wireless device comprises the wireless device such as a bar-code scanner or the like, and a charger composed of a power battery (secondary battery) incorporated into the wireless device. In this case, the charger has a wireless device placement portion, a pair of charging terminals exposed to the wireless device placement portion, a charging circuit portion for supplying charging power for the power battery to the pair of charging terminals, and a built-in magnet. Further, the wireless device includes the power battery, a pair of power receiving terminals provided at positions where the power receiving terminals are brought into contact with the pair of charging terminals when the wireless device is placed in the wireless device placement portion, and a magnetic switch.

When the wireless device is placed in the wireless device placement portion on the charger side upon non-use of the wireless device, the magnetic switch on the wireless device side senses magnetism of the magnet on the charger side with the placement of the wireless device in the wireless device placement portion. As a result, the magnetic switch is closed to connect the pair of power receiving terminals to both ends of the power battery. At this time, the charging power outputted from the charging circuit portion on the charger side is supplied to the power battery through the pair of charging terminals and the pair of power receiving terminals so that the power battery is charged. On the other hand, when the wireless device is disconnected from the wireless device placement portion on the charger side upon use of the wireless device, the magnetic switch on the wireless device side does not detect the magnetism of the magnet on the charger side with the disconnection of the wireless device from the wireless device placement portion. As a result, the magnetic switch is opened to disconnect one end of the power battery from one power receiving terminal, whereby the voltage of the power battery is not applied across the pair of charging terminals.

If a lead switch is used as the magnetic switch on the wireless device side in this case, it is then desirable because a small and simple circuit configuration is obtained.

Further, in another embodiment according to the present invention, non-connection detecting means for detecting a state of non-connection between a pair of charging terminals and a pair of power receiving terminals on the wireless device side is provided in a charging circuit portion on the charger side. Further, control means is provided which interrupts the supply of charging power to one charging terminal upon detection of the non-connection by the non-connection detecting means. It is preferable to provide the two means referred to above because even when an operator accidentally contacts between the pair of charging terminals on the charger side, the operator does not experience an abrupt impact due to an electric shock and even when some conductive material contacts between the pair of charging terminals, an electrical short across the pair of charging terminals is avoided.

In this case, a voltage detecting circuit for detecting a voltage applied across the charging terminals and/or a current detecting circuit for detecting a current flowing through the charging terminals can be used as the non-connection detecting means. Further, switching means for interrupting the supply of power to the pair of charging terminals can be used as the control means.

According to another embodiment of the present invention, no charging voltage is applied across the pair of charging terminals on the wireless device side when the wireless device is in use and is not placed in a wireless device placement portion on the charger side. Thus, when the operator accidentally contacts between the pair of charging terminals, the operator does not experience the abrupt impact due to the electric shock.

Further, when the conductive material contacts between the pair of charging terminals, the electrical short across the pair of charging terminals is avoided.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DETAILED DESCRIPTION OF THE PREFERRED EMBODIMENTS

Preferred embodiments of the present invention will hereinafter be described with reference to the accompanying drawings.

Figure 1:
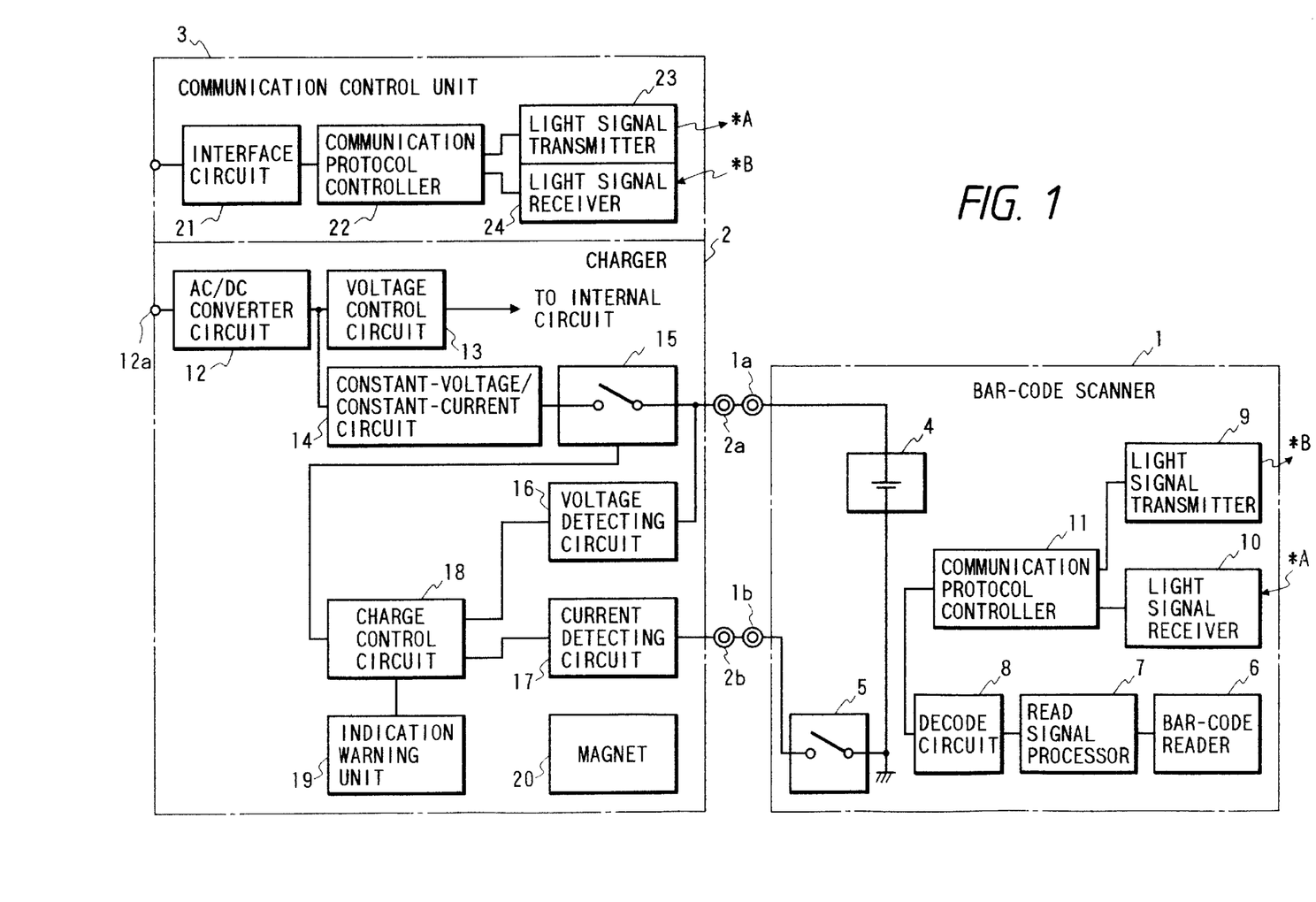
FIG. 1 is a block diagram showing one embodiment of a charging apparatus according to the present invention, which is suitable for use with a wireless device.

FIG. 1 is a block diagram showing one embodiment of a charging apparatus according to the present invention, which is suitable for use with a wireless device. FIG. 1 shows an example in which the wireless device is a bar-code scanner.

As shown in FIG. 1, the charging apparatus comprises a bar-code scanner 1, a pair of power receiving terminals 1a and 1b exposed to a main body (not shown) of the bar-code scanner 1, a charger 2, a pair of charging terminals 2a and 2b exposed to a bar-code scanner placement portion (not shown) provided on the upper side of a main body (not shown) of the charger 2, and a communication control unit 3. Here, the bar-code scanner 1 is substantially identical in external structure to a bar-code scanner 30 shown in FIG. 3A. Further, the charger 2 and the communication control unit 3 are also substantially similar in external structure to a charger 35 and a communication control unit 40 both shown in FIG. 3B.

The bar-code scanner 1 comprises a power battery 4 composed of a lithium-ion secondary battery, a magnetic switch 5 composed of a lead switch, a bar-code reader 6, a read signal processor 7, a decode circuit 8, a light signal transmitter 9, a light signal receiver 10 and a communication protocol controller 11. In this case, the positive-polarity side of the power battery 4 is electrically connected directly to one power receiving terminal 1a and the negative-polarity side thereof is electrically connected to the other power receiving terminal 1b through the magnetic switch 5. The output of the bar-code reader 6 is electrically connected to the input of the read signal processor 7. The output of the read signal processor 7 is electrically connected to the input of the decode circuit 8. The communication protocol controller 11 is electrically connected to the input of the light signal transmitter 9 and the output of the light signal receiver 10. In addition, the communication protocol controller 11 is also electrically connected to the decode circuit 8.

Further, the charger 2 comprises an ac/dc converter circuit (rectifying circuit) 12, an ac power terminal 12a, a voltage control circuit 13, a constant-voltage/constant-current circuit 14, a control switch (switching means) 15, a voltage detecting circuit 16, a current detecting circuit 17, a charge control circuit 18, a display or indication warning unit 19 and a magnet 20 incorporated into the main body (not shown). A circuit portion comprised of the ac/dc converter circuit 12, the ac power terminal 12a, the voltage control circuit 13, the constant-voltage/constant-current circuit 14, the control switch 15, the voltage detecting circuit 16, the current detecting circuit 17, the charge control circuit 18, and the indication warning unit 19 constitutes a charging circuit portion. In this case, the input of the ac/dc converter circuit 12 is electrically connected to the ac power terminal 12a and the output of the ac/dc converter circuit 12 is electrically connected to the input of the voltage control circuit 13 and the input of the constant-voltage/constant-current circuit 14. The output of the constant-voltage/constant-current circuit 14 is electrically connected to one charging terminal 2a through the control switch 15. The input of the voltage detecting circuit 16 is electrically connected to one charging terminal 2a. One input of the charge control circuit 18 is electrically connected to the output of the voltage detecting circuit 16. The other input of the charge control circuit 18 is electrically connected to the output of the current detecting circuit 17. One output of the charge control circuit 18 is electrically connected to a control terminal of the control switch 15. The other output of the charge control circuit 18 is electrically connected to the indication warning unit 19. The input of the current detecting circuit 17 is electrically connected to the other charging terminal 2b. The magnet 20 is incorporated and placed in a predetermined position within the main body so as to be opposed to the magnetic switch 5 incorporated into the bar-code scanner 1 placed in the bar-code scanner placement portion.

Further, the communication control unit 3 comprises an interface circuit 21 for providing interface with a host device (not shown), a communication protocol controller 22, a light signal transmitter 23 and a light signal receiver 24. In this case, the communication protocol controller 22 is electrically connected to the host device through the interface circuit 21 and is also electrically connected to the input of the light signal transmitter 23 and the output of the light signal receiver 24.

The charging apparatus constructed as described above is activated as follows:

When the bar-code scanner 1 reads a bar code, it is disconnected from the bar-code scanner placement portion of the charger 2 so as to read the bar code with the built-in power battery 4 as a power drive source. At this time, the bar-code reader 6 provided with a bar-code read element such as a CCD or the like converts the read bar code into an electric signal and outputs it therefrom. The read signal processor 7 performs processes such as amplification of the electric signal obtained by the bar-code reader 6, elimination of noise, binary coding, etc. The decode circuit 8 decodes a processed signal outputted from the read signal processor 7 and outputs the decoded signal therefrom. The communication protocol controller 11 transmits the decoded signal outputted from the decode circuit 8 to the outside, for instance, the communication control unit 3 through the light signal transmitter 9 as a light signal. The light signal receiver 10 receives a light control signal transmitted from the outside, e.g., the communication control unit 3 therein and supplies the received light control signal to the communication protocol controller 11 to control the communication protocol controller 11.

The ac/dc converter circuit 12 in the charger 2 rectifies an ac voltage supplied to the ac power terminal 12a so as to be converted into a dc voltage. Thereafter, the converted dc voltage is controlled to a constant voltage and/or constant current by the constant-voltage/constant-current circuit 14, followed by supply to one charging terminal 2a through the control switch 15. Incidentally, the charging terminal 2b is supplied with, for example, a ground potential and hence charging power is produced between the pair of charging terminals 2a and 2b. At this time, the voltage detecting circuit 16 monitors the voltage applied to one charging terminal 2a and the current detecting circuit 17 monitors the current that flows through the other charging terminal 2b. The voltage and current detecting circuits 16 and 17 supply their monitored outputs to the charge control circuit 18.

In the communication control unit 3, the communication protocol controller 22 is electrically connected to an external host computer (host device) through the interface circuit 21. When the light signal receiver 24 receives a light signal (decoded signal) transmitted from the bar-code scanner 1, the communication protocol controller 22 supplies the decoded signal to the external host computer through the interface circuit 21. On the other hand, the communication protocol controller 22 transmits a control signal supplied thereto from the external host computer through the interface circuit 21 to the light signal transmitter 23 from which the control signal is sent to the bar-code scanner 1 in the form of a light signal.

When the bar-code scanner 1 now performs the reading of the bar code and the like and is being disconnected from the bar-code scanner placement portion of the charger 2, the magnetic switch 5 incorporated into the bar-code scanner 1 does not sense magnetism produced from the magnet 20 incorporated into the charger 2 and contacts of the magnetic switch 5 are open. Therefore, the other power receiving terminal 1b is electrically disconnected from the power battery 4 and hence the voltage outputted from the power battery 4 is not applied across the pair of power receiving terminals 1a and 1b.

In the charger 2, the voltage detecting circuit 16 and/or the current detecting circuit 17 generate detected outputs each indicative of a non-charging state since the bar-code scanner 1 is spaced away from the bar-code scanner placement portion. Further, the charge control circuit 18 supplied with these detected outputs supplies a control signal to the control switch 15 so that the control switch 15 is changed from a closed state to an opened state. Thus, the charging terminal 2a is electrically disconnected from the charging circuit portion and therefore the charging circuit portion does not apply a charging voltage across the pair of charging terminals 2a and 2b.

Next, when the reading of the bar code by the bar-code scanner 1 and the like are finished and the bar-code scanner 1 is placed in the bar-code scanner placement portion of the charger 2, the magnetic switch 5 in the bar-code scanner 1 approaches the magnet 20 of the charger 2 and senses magnetism produced from the magnet 20 so that the contacts of the magnetic switch 5 are closed. Therefore, the other power receiving terminal 1b and the power battery 4 are electrically connected to each other so that the pair of power receiving terminals 1a and 1b are respectively electrically connected to both ends of the power battery 4.

In the charger 2, the voltage detecting circuit 16 and/or the current detecting circuit 17 generate detected outputs each indicative of a charging state because the bar-code scanner 1 is placed in the bar-code scanner placement portion. Further, the charge control circuit 18 supplied with these detected outputs supplies a control signal to the control switch 15 so that the control switch 15 is switched from the opened state to the closed state. As a result, the charging terminal 2a is electrically connected to the charging circuit portion and therefore the charging circuit portion applies a charging voltage across the pair of charging terminals 2a and 2b. Thus, the charging voltage applied across the pair of charging terminals 2a and 2b on the charger 2 side is supplied to the power battery 4 through the pair of power receiving terminals 1a and 1b on the bar-code scanner 1 side, whereby a predetermined charging operation is carried out.

Figure 2:
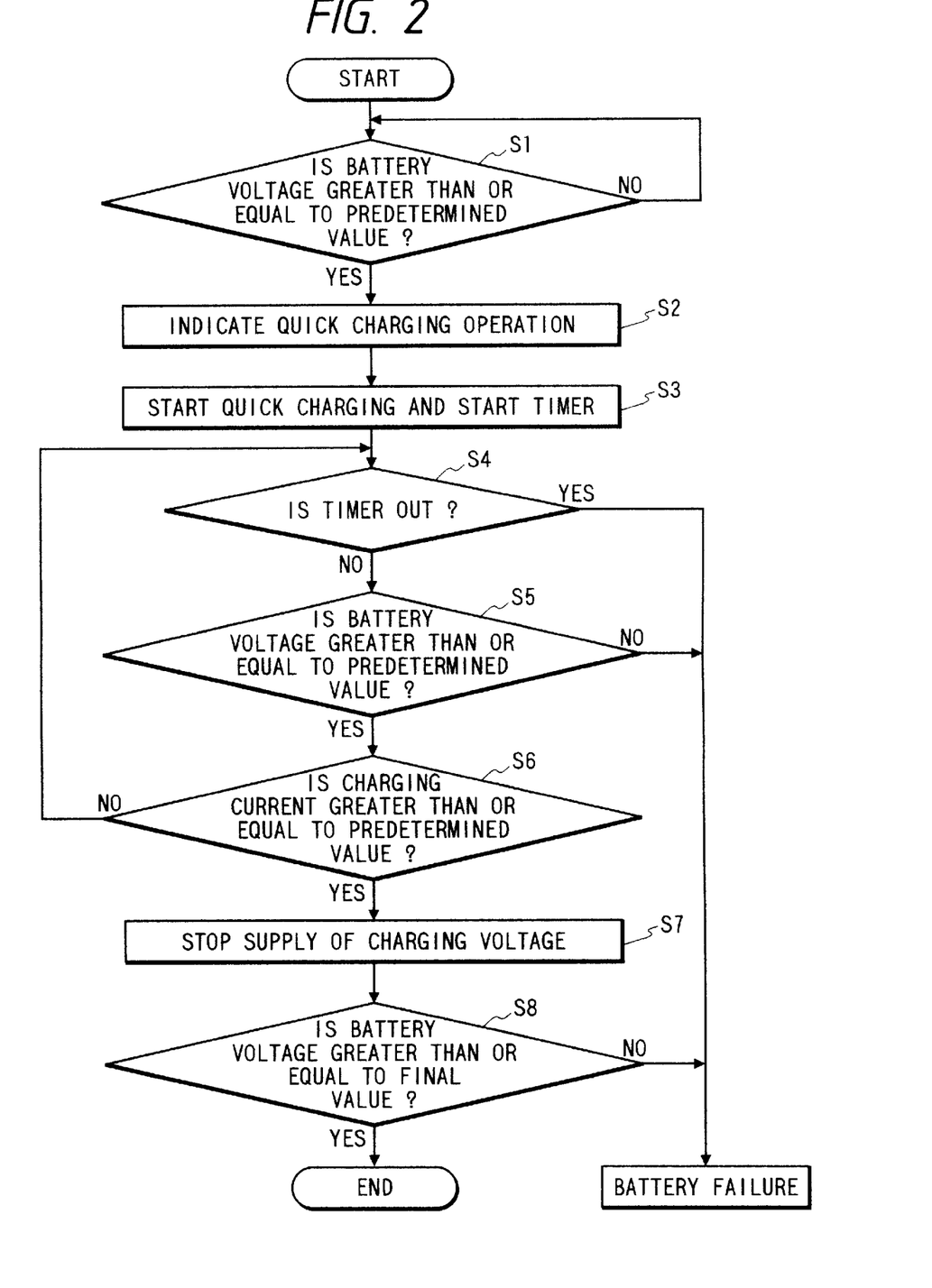
FIG. 2 is a flowchart for describing one example of the operation for charging a power battery of the wireless device by the charging apparatus shown in FIG.

FIG. 2 is a flowchart for explaining one example of the operation for charging the power batter 4 of the bar-code scanner 1 by the charger 2.

The operation for charging the power battery 4 of the bar-code scanner 1 will be described using this flowchart.

In Step S1, when the bar-code scanner 1 is placed in the bar-code scanner placement portion of the charger 2, the voltage detecting circuit 16 on the charger 2 side first detects a voltage applied to one charging terminal 2a, i.e., a voltage outputted from the power battery 4 of the bar-code scanner 1. Further, the charge control circuit 18 judges or determines whether the detected voltage is greater than or equal to a predetermined voltage V1 (e.g., 2.7V). If it is determined in Step S1 that the output voltage of the power battery 4 is greater than or equal to the predetermined voltage V1 (i.e., if the answer is found to be Y in Step S1), the routine procedure proceeds to the next Step S2. If it is determined in Step S1 that the output voltage of the power battery 4 is less than or equal to the predetermined voltage V1 (i.e., if the answer is found to be N in Step S1), the step S1 is repeatedly carried out.

Next, in Step S2, the charge control circuit 18 on the charger 2 side supplies a control voltage to the control switch 15 to close the control switch 15, thereby turning on a quick charge indicating lamp (not shown) of the indication warning unit 19.

Further, in Step S3, the charge control circuit 18 sets a quick charging timer circuit (not shown) so as to start quick charging for the power battery 4 of the bar-code scanner 1.

In Step S4 subsequent to Step S3, the charge control circuit 18 makes a decision as to whether the timer circuit is out. If it is determined in Step S4 that the timer circuit has not been brought to the timer-out (i.e., if the answer is found to be N in Step S4), then the routine procedure proceeds to the next Step S5. If it is determined in Step S4 that the timer circuit has been brought to the timer-out (i.e., if the answer is found to be Y in Step S4), then the power battery 4 is determined to be defective. Therefore, the charge control circuit 18 stops the quick charging of the power battery 4 so as to turn off the quick charge indicating lamp of the indication warning unit 19 and sounds a buzzer of the indication warning unit 19.

Next, the charge control circuit 18 determines in Step S5, based on the detected voltage produced from the voltage detecting circuit 16 whether the output voltage of the power battery 4 is greater than or equal to the predetermined voltage V1 (e.g., 2.7V). If the output voltage of the power battery 4 is determined to be greater than or equal to the predetermined voltage V1 (i.e., if the answer is found to be Y in Step S5), the routine procedure proceeds to the next Step S6. If the output voltage of the power battery 4 is judged not to reach the predetermined voltage V1 (i.e., if the answer is found to be N in Step S5), the power battery 4 is found to malfunction or fail. Therefore, the charge control circuit 18 stops the quick charging for the power battery 4 so as to turn off the quick charge indicating lamp of the indication warning unit 19 and sounds the buzzer of the indication warning unit 19.

Next, in Step S6, the charge control circuit 18 determines based on the detected current produced from the current detecting circuit 17 whether the charging current is reduced to less than or equal to a predetermined current value I1 (e.g., 100 mA). If the charging current is determined to be less than or equal to the predetermined current value I1 (i.e., if the answer is found to be Y in Step S6), the routine procedure proceeds to Step S7. If the charging current is judged to still exceed the predetermined current value I1 (i.e., if the answer is found to be N in Step S6), then the routine procedure is returned to Step S5 and the step operations subsequent to Step S5 are repeatedly executed.

Subsequently, in Step S7, the charge control circuit 18 supplies a control voltage to the control switch 15 to open the control switch 15, thereby stopping the supply of the charging voltage to one charging terminal 2a.

In Step S8 subsequent to Step S7, the charge control circuit 18 determines based on the detected voltage produced from the voltage detecting circuit 16 whether the output voltage of the power battery 4 is greater than or equal to a predetermined voltage V2 (e.g., 3.8V). If the output voltage of the power battery 4 is determined to be greater than or equal to the predetermined voltage V2 (i.e., if the answer is found to be Y in Step S8), then a series of charging operations is terminated. If the output voltage of the power battery 4 is determined not to reach the predetermined voltage V2 (i.e., if the answer is found to be N in Step S8), the power battery 4 is found to be defective. Therefore, the charge control circuit 18 stops the quick charging for the power battery 4 so as to turn off the quick charge indicating lamp of the indication warning unit 19 and sounds the buzzer of the indication warning unit 19.

Thus, according to the charging apparatus according to the present embodiment, which is suitable for use with the bar-code scanner, the voltage of the power battery 4 is not applied across the pair of power receiving terminals 1a and 1b on the bar-code scanner 1 side when the bar-code scanner 1 is spaced away from the bar-code scanner placement portion of the charger 2. Therefore, an operator or the like does not undergo an abrupt impact due to an electric shock even if the operator accidentally makes contact with the exposed pair of power receiving terminals 1a and 1b in the case of the reading of the bar code by the bar-code scanner 1 and the like. Further, even when a conductive object or material contacts between the bare pair of power receiving terminals 1a and 1b, no electrical short occurs across the pair of power receiving terminals 1a and 1b and the power battery 4 does not suddenly wear.

In the charging apparatus according to the present embodiment as well, since only the magnet 20 and the magnetic switch 5, particularly, the lead switch are used as means for prevention of the electric shock and short between the pair of power receiving terminals 1a and 1b, the bar-code scanner 1 and the charger 2 do not need to change their sizes and can be formed simply and at low cost.

Further, in the charging apparatus according to the present embodiment, since the charging voltage produced from the charging circuit portion is not applied across the pair of charging terminals 2a and 2b on the charger 2 side when the bar-code scanner 1 is spaced away from the bar-code scanner placement portion of the charger 2, the operator or others of the bar-code scanner 1 do not experience the abrupt impact due to the electric shock even if being accidentally brought into contact with the pair of charging terminals 2a and 2b that project from the bar-code scanner placement portion. Further, even if the conductive material contacts between the pair of charging terminals 2a and 2b that project from the bar-code scanner placement portion, no electrical short occurs across the pair of charging terminals 2a and 2b.

Although the aforementioned embodiment has described the case in which the wireless device is used as the bar-code scanner 1 by way of example, the wireless device to be used for the present invention is not necessarily limited to the bar-code scanner. It is needless to say that another wireless device similar to the bar-code scanner 1 may be used.

In the above-described embodiment, the electric shock and short preventing means is provided which is capable of avoiding the application of the charging voltage produced from the charging circuit portion across the pair of charging terminals 2a and 2b on the charger 2 side when the bar-code scanner 1 is separated from the bar-code scanner placement portion of the charger 2. However, the electric shock and short preventing means is not an essential forming means for the present invention and may be omitted as needed.

Further, the above-described embodiment has described the case in which the lead switch is used as the magnetic switch 5 by way of example. However, the magnetic switch is not necessarily limited to the lead switch. Another magnetic switch may be used if activated in response to magnetism.

Having now fully described the invention, it will be apparent to those skilled in the art that many changes and modifications can be made without departing from the spirit or scope of the invention as set forth herein.

What is claimed is:

1. A charging apparatus suitable for use with a wireless device, comprising:
   a charger including,
   a wireless device placement portion;
   a pair of charging terminals exposed to said wireless device placement portion;
   a charging circuit portion for supplying power for charging said wireless device to said pair of charging terminals; and
   a magnet incorporated therein; and said wireless device including,
   a secondary battery;
   a pair of power receiving terminals respectively provided at positions where said terminals are brought into contact with said pair of charging terminals when said wireless device is placed in said wireless device placement portion; and
   a magnetic switch,
   wherein when said wireless device is placed in said wireless device placement portion and said magnetic switch detects magnetism of said magnet, said secondary battery is electrically connected to said pair of power receiving terminals so as to charge said secondary battery.

2. A charging apparatus according to claim 1, wherein said magnetic switch is a lead switch.

3. A charging apparatus according to claim 2, wherein said charging circuit portion detects a non-connection of said pair of power receiving terminals on said wireless device side to said pair of charging terminals and interrupts the supply of charging power to said pair of charging terminals upon detection by said charging circuit portion.

4. A charging apparatus according to claim 1, wherein said charging circuit portion detects a non-connection of said pair of power receiving terminals on said wireless device side to said pair of charging terminals and interrupts the supply of charging power to said pair of charging terminals upon detection by said charging circuit portion.

5. A charging apparatus according to claim 4, wherein the detection of the non-connection of said pair of power receiving terminals on the wireless device side to said pair of charging terminals is performed by using a voltage applied across said pair of charging terminals and/or a current flowing therethrough and the interruption of the supply of the charging power to said pair of charging terminals is performed by switching means for interrupting the supply of the power to said pair of charging terminals.

* * * * *